US00RE49272E

(19) United States
(12) Reissued Patent
Mamadgi et al.

(10) Patent Number: US RE49,272 E
(45) Date of Reissued Patent: Nov. 1, 2022

(54) ADAPTIVE DETERMINATION OF INFORMATION DISPLAY

(71) Applicant: Samsung Electronics Co., Ltd., Suwon-si (KR)

(72) Inventors: Ravindra Raj Mamadgi, Fremont, CA (US); Abraham Kang, Los Gatos, CA (US)

(73) Assignee: SAMSUNG ELECTRONICS CO., LTD., Suwon-si (KR)

(21) Appl. No.: 16/715,935

(22) Filed: Dec. 16, 2019

Related U.S. Patent Documents

Reissue of:
(64) Patent No.: 9,836,184
Issued: Dec. 5, 2017
Appl. No.: 14/044,219
Filed: Oct. 2, 2013

U.S. Applications:
(63) Continuation of application No. 16/180,221, filed on Nov. 5, 2018, which is an application for the reissue of Pat. No. 9,836,184.

(51) Int. Cl.

| | |
|---|---|
| ***G06F 3/048*** | (2013.01) |
| ***G06F 3/0482*** | (2013.01) |
| ***G06F 3/0488*** | (2022.01) |
| ***G06F 3/0485*** | (2022.01) |
| ***G06F 3/0483*** | (2013.01) |

(52) U.S. Cl.
CPC ..... *G06F 3/0482* (2013.01); *G06F 3/0483* (2013.01); *G06F 3/0485* (2013.01); *G06F 3/0488* (2013.01)

(58) Field of Classification Search
CPC ..... G06F 3/0482; G06F 3/0485; G06F 3/0488
See application file for complete search history.

(56) References Cited

U.S. PATENT DOCUMENTS

| | | | | |
|---|---|---|---|---|
| 2007/0197287 | A1* | 8/2007 | Shimizu | A63F 13/10 463/31 |
| 2009/0193351 | A1* | 7/2009 | Lee | G06F 3/0482 715/769 |
| 2009/0278806 | A1* | 11/2009 | Duarte | G06F 3/0416 345/173 |
| 2010/0205563 | A1* | 8/2010 | Haapsaari | G06F 3/0482 715/725 |
| 2011/0083105 | A1 | 4/2011 | Shin et al. | |

(Continued)

FOREIGN PATENT DOCUMENTS

WO 2010089722 A1 8/2010

OTHER PUBLICATIONS

Extended European Search Report dated Nov. 26, 2015 in corresponding European Patent Application No. 14176852.3, 10 pages.

*Primary Examiner* — Woo H Choi
(74) *Attorney, Agent, or Firm* — Sughrue Mion, PLLC

(57) ABSTRACT

A method for operating a list in a mobile terminal is disclosed. An example method includes displaying a first set of items from an item list in the mobile terminal, changing the item list based on a received command, determining a direction of most recent movement in the item list before the receiving of the command, determining items from the item list to display according to the determined direction and the change of the item list, and displaying the determined items from the item list.

23 Claims, 6 Drawing Sheets

(56) References Cited

U.S. PATENT DOCUMENTS

| | | | | |
|---|---|---|---|---|
| 2012/0011466 | A1 | 1/2012 | Miyamoto et al. | |
| 2012/0047463 | A1 | 2/2012 | Park et al. | |
| 2014/0368422 | A1* | 12/2014 | Gupta | G06F 3/0304 345/156 |

* cited by examiner

ADAPTIVE DETERMINATION OF INFORMATION DISPLAY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*Notice: More than one reissue application has been filed for the reissue of U.S. Pat. No. 9,836,184. The reissue applications are the present application and application Ser. No. 16/180,221 (now RE47,812). Application Ser. No. 16/180,221 is a reissue application of U.S. Pat. No. 9,836,184. The present application is a continuation reissue of application Ser. No. 16/180,221.*

BACKGROUND

Mobile terminals such as portable media players, smartphones, tablet Personal Computers (PCs), and similar devices have increased in use due to enhanced wireless network connectivity and low power functionality. Accordingly, it is common to use such mobile terminals to view content on the Internet such as news media in the form of static and dynamic webpages, streaming video and audio content, and so forth. In addition, mobile terminals also provide various methods of performing communication such as messaging, voice calls, video calls, voice mail, and so forth.

However, mobile terminals are generally configured to be as small as possible to enhance portability of the devices. As such, the screens on such mobile terminals are limited in physical size and therefore provide a specific user interface to maximize the display of the content without burdening the user with various options to control the user interface.

When manipulating a list or tab of windows in a mobile terminal, the mobile terminal always moves the list in a fixed direction when an item in the list is added or deleted. That is, when deleting an item in a list, the list below the deleted item is moved upward to replace the deleted list item. The list may also be horizontal such as a tab of web browsers. When deleting a tab of a web browser from a group, the browsers are reduced in size such that a user can swipe and change the focus to select, delete, or add a new tab. However, after deletion of a tab, the focus always returns to the adjacent tab to the right. That is, if a user is viewing a third tab, the user inputs a command to view the tabs, inputs a gesture to move left to the second tab, and then deletes the second tab, the focus always returns to the third tab.

The above information is presented as background information only to assist with an understanding of the present disclosure. No determination has been made, and no assertion is made, as to whether any of the above might be applicable as prior art with regard to the present invention.

SUMMARY

Aspects of the present invention are to address at least the above-mentioned problems and/or disadvantages and to provide at least the advantages described below. Accordingly, an aspect of the present invention is to provide a method which automatically expands and contracts panes displayed on a screen of a mobile device according to a user's interaction with the displayed panes.

In accordance with an aspect of the present invention, a method for manipulating a list in a mobile terminal is provided. The method displaying a first set of items from an item list in the mobile terminal, changing the item list based on a received command, determining a direction of most recent movement in the item list before the receiving of the command, determining items from the item list to display according to the determined direction and the change of the item list, and displaying the determined items from the item list.

In accordance with another aspect of the present invention, there is a method for operating multiple instances of an application mobile terminal is provided. The method displaying a first set of application tabs that are arranged in a horizontal manner, the first set of application tabs including a source application tab that is selected to receive input to perform a corresponding command, receiving a first instruction to select a target application tab according to a directional input, receiving a second instruction to change the first set of application tabs according to the selected target application tab, determining a next application tab of the first set of application tabs to select based on the directional input and the second instruction, and displaying the next selected application tab.

In accordance with an aspect of the present invention, a method for manipulating a list in a mobile terminal is provided. The method includes displaying a first set of items from an item list in the mobile terminal, determining whether a first touch input and a second touch input are simultaneously providing during the display of the first set of items, determining whether the first touch input and the second touch input move relative to an item displayed in the item list, rescaling at least one item in the first set of items based on the first touch and the second touch according to the distance the first touch and the second touch move, if the distance that the first touch input and the second touch input move exceeds a threshold, determining a command to change the item list is being input, changing the item list based on the determined command, and displaying the item list according to the changed item list.

Other aspects, advantages, and salient features of the invention will become apparent to those skilled in the art from the following detailed description, which, taken in conjunction with the annexed drawings, discloses embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Furthermore, FIGS. 1 though 7C, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged portable electronic device. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Figure 1:
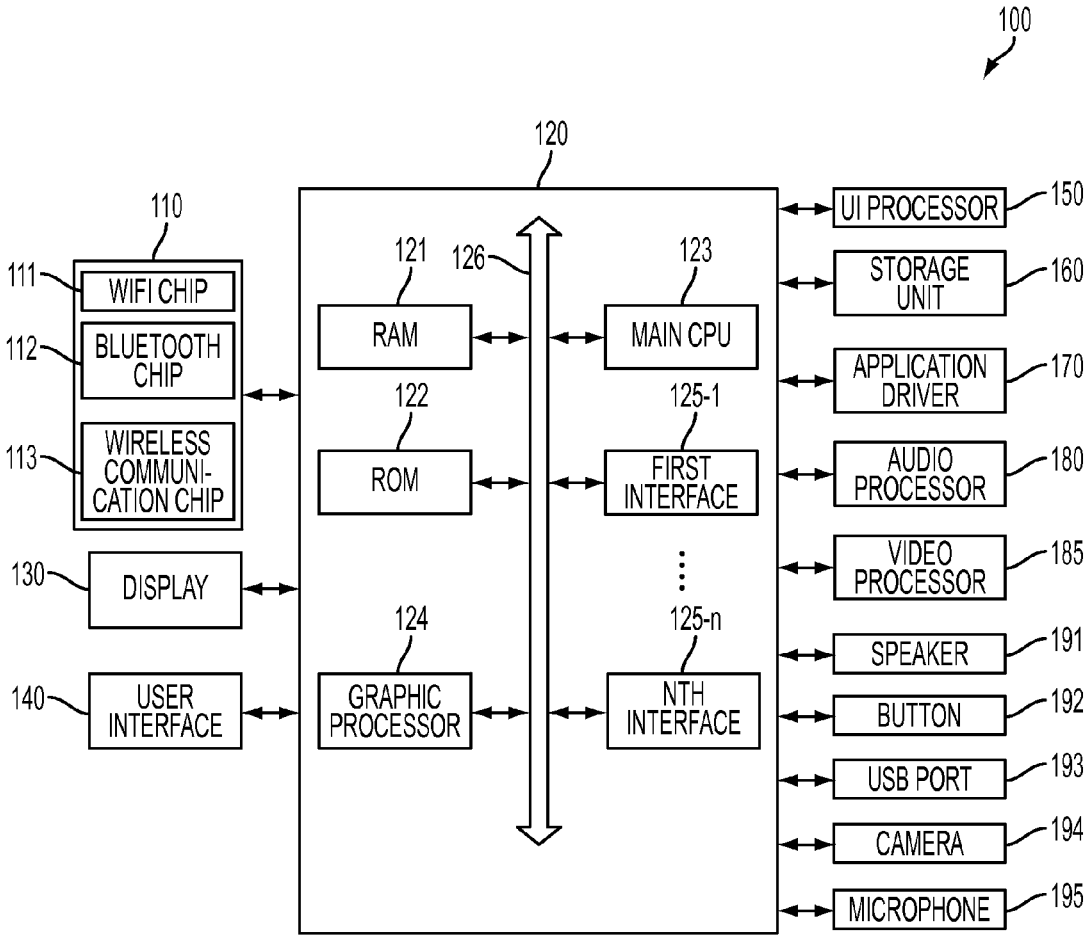
FIG. 1 is a block diagram of a mobile terminal according to an embodiment of the present disclosure.

FIG. 1 is a block diagram of the terminal device according to an embodiment of the present disclosure.

Referring to FIG. 1, the terminal device 100 includes a communication device 110, the controller 120, the display 130, a user interface 140, a storage unit 160, an application driver 170, an audio processor 180, a video processor 185, a speaker 191, an interface unit 192, a USB port 193, a camera 194, and a microphone 195.

The communication device 110 performs communication functions with various types of external apparatuses. The communicator device 120 may include various communication devices such as a Wireless Fidelity (WiFi) device 111, a Bluetooth® device 112, a wireless communication device 113, and so forth. The WiFi device 111 and the Bluetooth device 112 perform communication according to a WiFi standard and a Bluetooth® standard, respectively. The wireless communication 113 device performs communication according to various communication standards such as Zigbee®, 3rd Generation (3G), 3rd Generation Partnership Project (3GPP), Long Term Evolution (LTE), and so forth. In addition, the communication device 110 may further include an Near Field Communication (NFC) device that operates according to a NFC method by using bandwidth from various Radio Frequency-IDentification (RF-ID) frequency bands such as 135 kHz, 13.56 MHz, 433 MHz, 860-960 MHz, 2.45 GHz, and so on.

The operation of the controller 120 reads a computer readable medium and performs instructions according to the computer readable medium, which is stored in the storage unit 160. The storage unit 160 may also store various data such as Operating System (O/S) software, applications, multimedia content (e.g., video files, music files, etc.), user data (documents, settings, etc.), and so forth.

Other software modules which are stored in the storage unit 160 will be described later with reference to FIG. 2.

The user interface 140 is an input device configured to receive user input and transmit a user command corresponding to the user input to the controller 120. For example, the user interface 140 may be implemented by any suitable input such as touch pad, a key pad including various function keys, number keys, special keys, text keys, or a touch screen, for example. Accordingly, the user interface 140 receives various user commands to manipulate a displayed list (e.g., a list of contacts).

The UI processor 150 may generate various types of Graphical UIs (GUIs). Specifically, the UI processor 150 may process and generate various UI screens in 2D or 3D form. Generally, the UI screen may be a screen which is associated with the execution an application that displays a list. In addition, the UI screen may be a screen which displays text or diagrams such as a menu screen, a warning sentence, a time, a channel number, etc.

Further, the UI processor 150 may perform operations such as 2D/3D conversion of UI elements, adjustment of transparency, color, size, shape, and location, highlights, animation effects, and so forth.

The storage unit 160 is a storage medium that stores various computer readable mediums that are configured to operate the terminal device 100, and may be realized by any suitable storage device such as a Hard Disk Drive (HDD), a flash memory module, and so forth. For example, the storage unit 160 may comprise a Read Only Memory (ROM) for storing programs to perform operations of the controller 120, a Random Access Memory (RAM) 121 for temporarily storing data of the controller 120, and so forth. In addition, the storage unit 160 may further comprise Electrically Erasable and Programmable ROM (EEPROM) for storing various reference data.

The application driver 170 executes applications that may be provided by the terminal device 100. Such applications are executable and perform user desired functions such as playback of multimedia content, messaging functions, communication functions, display of data retrieved from a network, and so forth.

The audio processor 180 is configured to process audio data for input and output of the terminal device 100. For example, the audio processor 180 may decode data for playback, filter audio data for playback, encode data for transmission, and so forth.

The video processor 185 is configured to process video data for input and output of the terminal device 100. For example, the video pre-processor 185 may decode video data for playback, scale video data for presentation, filter noise, convert frame rates and/or resolution, encode video data input, and so forth.

The speaker 191 is provided to output audio data processed by the audio processor 180 such as alarm sounds, voice messages, audio content from multimedia, audio content from digital files, and audio provided from applications, and so forth.

The interface unit 192 may be configured based on the terminal device 100 and include any suitable input mechanism such a as mechanical button, a touch pad, a wheel, and so forth. The interface unit 192 is generally on a particular position of the terminal device 100, such as on the front, side, or rear of the external surface of the main body. For example, a button to turn the terminal device 100 on and off may be provided on a side.

The USB port 193 may perform communication with various external apparatuses through a USB cable or perform recharging. In other examples, suitable ports may be included to connect to external devices such as a 802.11 Ethernet port, a proprietary connector, or any suitable connector associated with a standard to exchange information.

The camera 194 may be configured to capture (i.e., photograph) an image as a photograph or as a video file (i.e., movie). The camera 194 may include any suitable number of cameras in any suitable location. For example, the terminal device 100 may include a front camera and rear camera.

The microphone 195 receives a user voice or other sounds and converts the same to audio data. The controller 120 may use a user voice input through the microphone 195 during an audio or a video call, or may convert the user voice into audio data and store the same in the storage unit 160.

When the camera 194 and the microphone 195 are provided, the controller 120 may receive based on a speech input into the microphone 195 or a user motion recognized by the camera 194. Accordingly, the terminal device 100 may operate in a motion control mode or a voice control mode. When the terminal device 100 operates in the motion control mode, the controller 120 captures images of a user by activating the camera 194, determines if a particular user motion is input, and performs an operation according to the input user motion. When the terminal device 100 operates in the voice control mode, the controller 120 analyzes the audio input through the microphone and performs a control operation according to the analyzed audio.

In addition, various external input ports are provided to connect to various external terminals such as a headset, a mouse, a Local Area Network (LAN), etc., may be further included.

Generally, the controller 120 controls overall operations of the terminal device 100 using various computer readable mediums that are stored in the storage unit 160. The controller 120 may also control the terminal device 100 via computer readable mediums that are received through the communication device 110 and not stored in the storage unit 160 for, for example, security reasons.

For example, the controller 120 may initiate an application stored in the storage unit 160, and execute the application by displaying a user interface to interact with the application. In other examples, the controller 120 may playback media content stored in the storage unit 160 and may communicate with external apparatuses via the communication device 110.

Specifically, the controller 120 comprises a RAM 121, a ROM 122, a main CPU 123, a graphic processor 124, a first to nth interfaces 125-1~125-n, and a bus 126. In some examples, the components of the controller 120 may be integral in a single packaged integrated circuit. In other examples, the components may be implemented in discrete devices (e.g., the graphic processor 124 may be a separate device).

The RAM 121, the ROM 122, the main CPU 123, the graphic processor 124, and the first to nth interfaces 125-1-125-n may be connected to each other through a bus 126.

The first to nth interfaces 125-1-125-n are connected to the above-described various components. One of the interfaces may be a network interface which is connected to an external apparatus via the network.

The main CPU 123 accesses the storage unit 160 and to initiate a booting process to execute the O/S stored in the storage unit 160. After booting the O/S, the main CPU 123 is configured to perform operations according to software modules, contents, and data stored in the storage unit 160.

The ROM 122 stores a set of commands for system booting. If a turn-on command is input and power is supplied, the main CPU 123 copies an O/S stored in the storage unit 160 onto the RAM 121 and boots a system to execute the O/S. Once the booting is completed, the main CPU 123 may copy application programs in the storage unit 260 onto the RAM 221 and execute the application programs.

The graphic processor 124 is configured to generate a screen including objects such as, for example an icon, an image, and text using a computing unit (not shown) and a rendering unit (not shown). The computing unit computes property values such as coordinates, shape, size, and color of each object to be displayed according to the layout of the screen using input from the user. The rendering unit generates a screen with various layouts including objects based on the property values computed by the computing unit. The screen generated by the rendering unit is displayed by the display 130.

Albeit not illustrated in the drawing, the terminal device 100 may further comprise a sensor (not shown) configured to sense various manipulations such as touch, rotation, tilt, pressure, approach, etc. with respect to the terminal device 100. In particular, the sensor (not shown) may include a touch sensor that senses a touch that may be realized as a capacitive or resistive sensor. The capacitive sensor calculates a touch coordinates by sensing micro-electricity provided when the user touches the surface of the display 130, which includes a dielectric coated on the surface of the display 130. The resistive sensor comprises two electrode plates that contact each other when a user touches the screen, thereby allowing electric current to flow to calculate the touch coordinates. As such, a touch sensor may be realized in various forms. In addition, the sensor may further include additional sensors such as a orientation sensor to sense a rotation of the terminal device 100 and an acceleration sensor to sense displacement of the terminal device 100.

FIG. 1 illustrates an example of specific elements included in the terminal device 100. However, components the terminal device 100 may be added, omitted, or changed according to the configuration of terminal device. For example, a Global Positioning System (GPS) receiver (not shown) to receive a GPS signal from GPS satellite and calculate the current location of the terminal device 100, and a Digital Multimedia Broadcasting (DMB) receiver (not shown) to receive and process a DMB signal may be further included.

Figure 2:
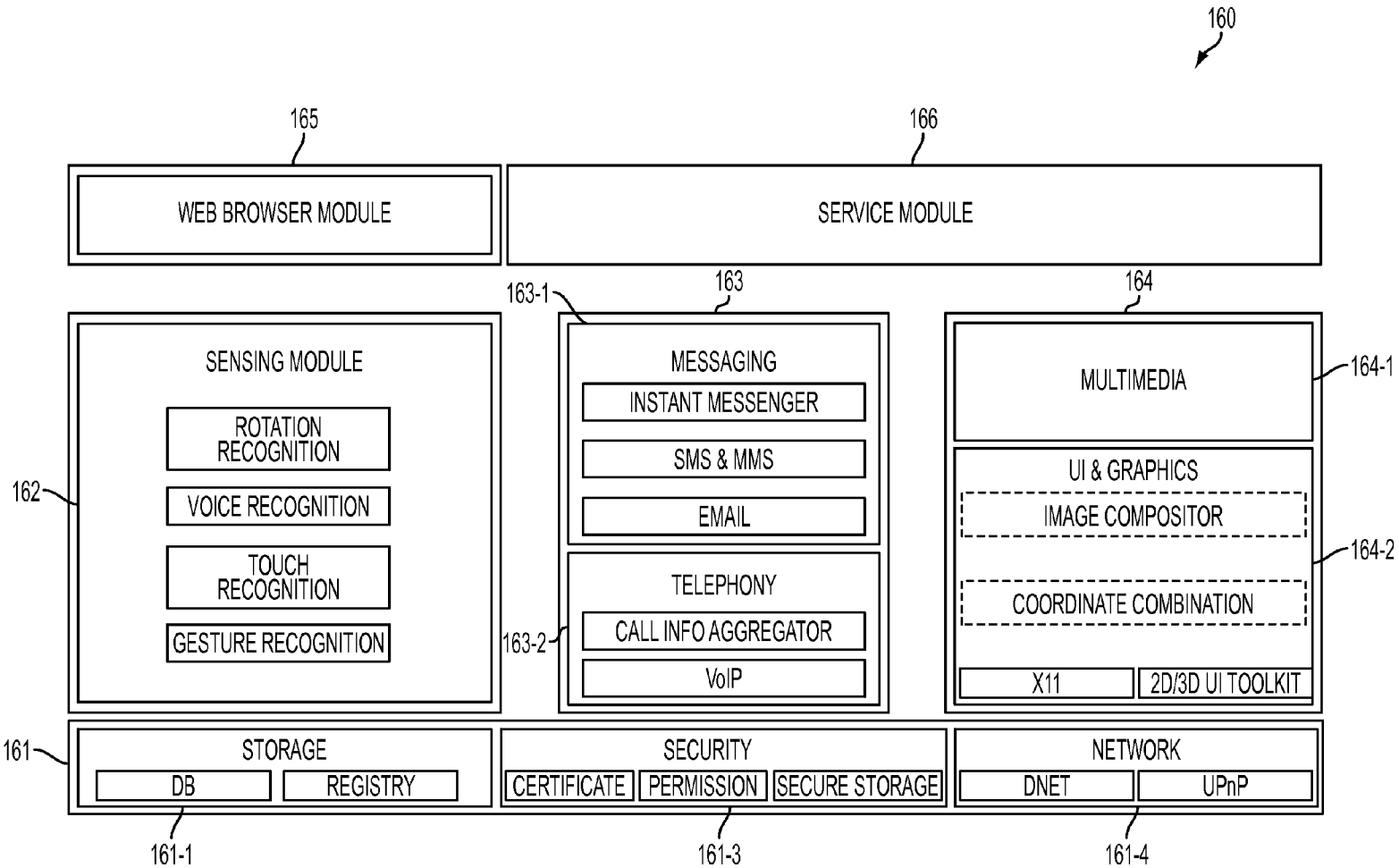
FIG. 2 is a block diagram of software modules in a storage unit 160 according to an embodiment of the present disclosure.

FIG. 2 is a block diagram of software modules in a storage unit 160 according to an embodiment of the present disclosure.

Referring to FIG. 2, the storage unit 160 may store software including a base module 161, a sensing module 162, a communication module 163, a presentation module 164, a web browser module 165, and a service module 166.

The base module 161 refers to a basic module which processes a signal transmitted from hardware included in the terminal device 100 and transmits the processed signal to an upper layer module. The base module 161 includes a storage module 161-1, a security module 161-2, and a network module 161-3. The storage module 161-1 is a program module including database or registry. The main CPU 123 may access a database in the storage unit 160 using the storage module 161-1 to read out various data. The security module 161-2 is a program module which supports certification, permission, secure storage, etc. with respect to hardware, and the network module 161-3 is a module which supports network connections, and includes a DNET module, a Universal Plug and Play (UPnP) module, and so forth.

The sensing module 162 collects information from various sensors, analyzes the collected information, and manages the collected information. The sensing module 162 may include suitable modules such as a face recognition module, a voice recognition module, a touch recognition module, a motion recognition (i.e., gesture recognition) module, a rotation recognition module, and an NFC recognition module, and so forth.

The communication module 163 performs communication with other devices. The communication module 163 may include any suitable module according to the configuration of the terminal device 100 such as a messaging module 163-1 (e.g., a messaging application), a Short Message Service (SMS) & a Multimedia Message Service (MMS) module, an e-mail module, etc., and a call module 163-2 that includes a call information aggregator program module (e.g., a VoIP module), and so forth.

The presentation module 164 composes an image to display on the display 130. The presentation module 164 includes suitable modules such as a multimedia module 164-1 and a UI rendering module 164-2. The multimedia module 164-1 may include suitable modules for generating and reproducing various multimedia contents, screens, and sounds. For example, the multimedia module 164-1 includes a player module, a camcorder module, a sound processing module, and so forth. The UI rendering module 164-2 may include an image compositor module for combining images, a coordinates combination module for combining and generating coordinates on the screen where an image is to be displayed, an X11 module for receiving various events from hardware, a 2D/3D UI toolkit for providing a tool for composing a UI in 2D or 3D form, and so forth.

The web browser module 165 accesses a web server to retrieve data and displays the retrieved data in response to a user input. The web browser module 165 may also be configured to transmit user input to the web server. The web browser module 165 may include suitable modules such as a web view module for composing a web page according to the markup language, a download agent module for downloading data, a bookmark module, a web-kit module, and so forth.

The service module 166 is a module including applications for providing various services. Specifically, the service module 166 may include program modules such as a navigation program, a content reproduction program, a game program, an electronic book program, a calendar program, an alarm management program, other widgets, and so forth.

FIG. 2 illustrates various program modules, but some of the various program modules may be omitted, changed, or added according to the configuration of the terminal device 100. For example, a location-based module which supports a location-based service in association with hardware such as a GPS receiver may be further included. In another example, the camera 194 or the USB port 193 may not be included because the terminal device 100 is configured for a high-security location.

Figure 3:
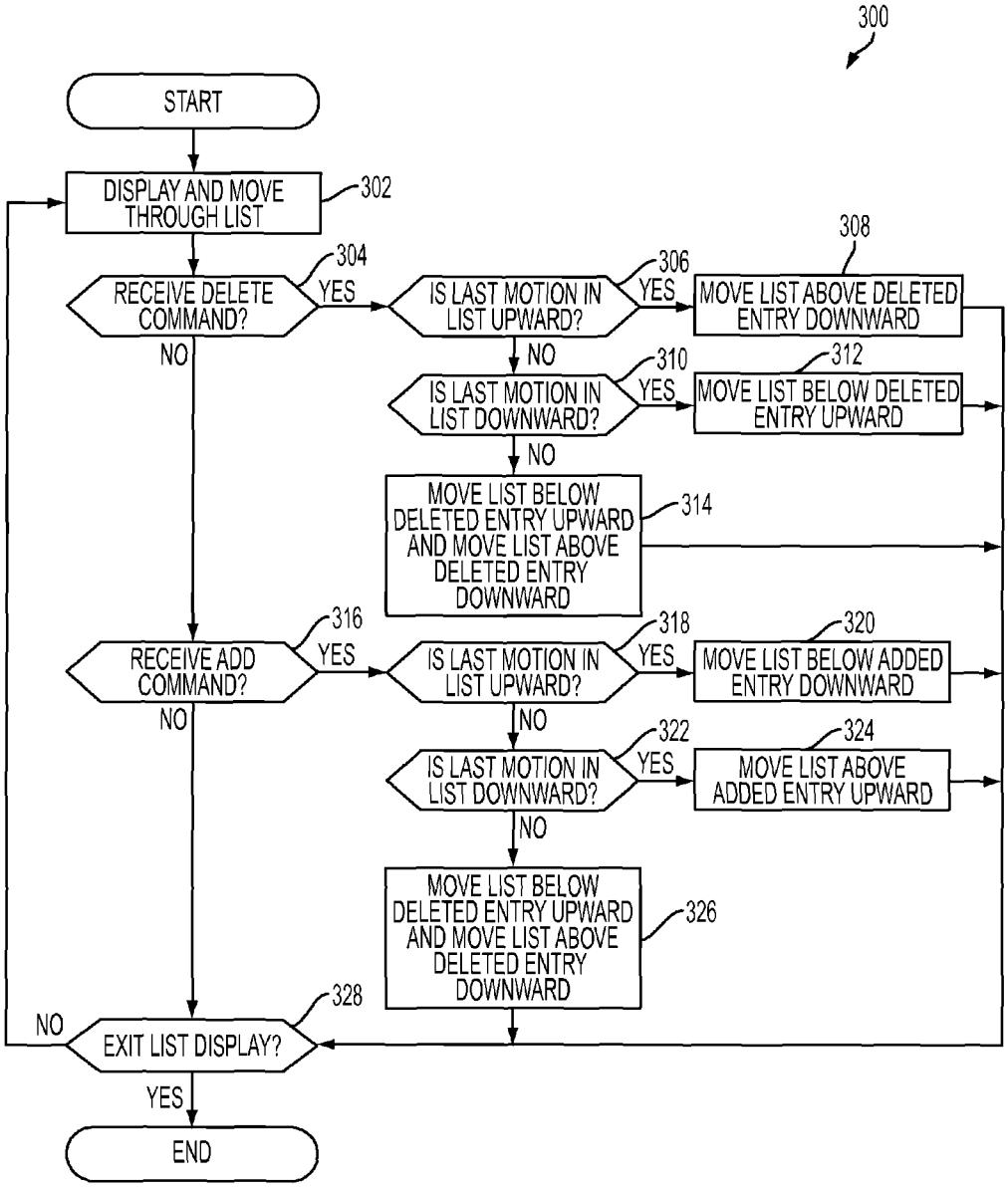
FIG. 3 is a flowchart illustrating a method of manipulating a list according to an embodiment of the present disclosure.

FIG. 3 is a flowchart illustrating a method of manipulating a list according to an embodiment of the present disclosure.

Referring to FIG. 3, an example method 300 is provided for displaying and manipulating a list. Although FIG. 3 is discussed within the context of a vertically displayed list, the example method 300 may also be implemented in a horizontally based list (e.g., a list of tabs, etc.). For purposes of clarity, it is presumed that FIG. 3 provides a list that displays names alphabetically in descending order (i.e., from A to Z), however the example of FIG. 3 can apply to any list that do not have any particular order (e.g., a list of notes, a grocery list, and so forth).

The method 300 is initiated at operation 302 when a user of the terminal device initiates a list by any suitable operation (e.g., viewing a list of contacts, creating multiple tabs in a web browser application, and so forth). In some examples, the list may be a vertically based list such as a list of contacts, for example. However, the list can be provided in any suitable form such as a list horizontally displayed (e.g. a group of tabs), arranged in a two dimension manner such as a diagonally based list or a list including having multiple columns, or arranged in three dimensions. The user at operation 302 moves through the list via any suitable input (e.g., scrolling through the list with a touch input, a stylus input at a fixed location to move the display down, etc.).

At operation 304, the method 300 determines if a delete key was input by the user. If the delete key was input, the method 300 deletes the list item at operation 304, which removes the list item from the display. Accordingly, the method 300 then determines if the last motion in the list was in the upward direction at operation 306. For example, presuming a list that displays names alphabetically in descending order, the user would be scrolling from the bottom of the list to the top of the list. As an example, if the device is capable of receiving touch input, a user inputs a vertical swipe from the top of the screen toward the bottom of the screen to cause upward movement in the list. If the last motion was upward, the method 300 moves the content of the list above the deleted entry downward to replace the deleted entry at operation 308. That is, the example method 300 continues the user's previous movement direction to display items in the list above the deleted entry.

Referring back to operation 306, if the last motion was not in the upward direction, it is determined if the last motion in the list was in the downward direction at operation 310. For example, if the device is capable of receiving touch input, a user inputs a vertical swipe from the bottom of the screen toward the top of the screen to cause upward movement in the list. If the last motion in the list was in the downward direction (e.g., a user is scrolling from the top of the list to the bottom of the list), the method 300 moves the content of the list that is below the deleted entry upward to replace the deleted entry at operation 312. That is, the example method 300 continues the user's previous movement direction to display items in the list above the deleted entry.

Referring back to operation 310, if the last motion was not in the downward direction, the direction of the user's last motion cannot be determined. In some examples, the example method 300 may not be able to determine the most recent motion in the list due to an intervening event such as a phone call, a multitasking event, for example. Accordingly, if user's last motion cannot be determined, the list above the deleted entry is moved in the downward direction and the list below the deleted entry is moved in the upward direction at operation 314.

In other examples, the displayed list may have a default list movement (e.g., upward) if it cannot determine the direction of the most recent movement. Further, the example process 300 may have a minimum amount of input in the list movement to determine that the list moves in a particular direction. For example, if the list movement changed by displaying 1 new list entry and 1 partial list entry (i.e., the text of the list entry is partially displayed), it may be determined that there is sufficient movement in the list to constitute movement in that particular direction.

Referring back to operation 304, if it is determined that a delete command is not input, the example method 300 determines if an add command is input at operation 316. If an add command is input, the example method 300 determines a position in the list to insert the new entry at operation 316. For example, the method 300 may insert a new entry based on the user's most recent touch location in the list.

After inserting the new entry at operation 316, the example method 300 determines if the last motion in the list was in the upward direction at operation 318. If the last motion in the list was in the upward direction, the portion of the list below the added entry is moved in the downward direction at operation 320. That is, the most recently displayed list item is continued to be displayed during the adding operation.

Referring back to operation 318, if the last motion was not in the upward direction, it is determined if the last motion was in the downward direction at operation 322. If the last motion was in the downward direct, the example method 300 moves the list above the added entry in the upward direction at operation 324. That is, the most recently displayed list item is continued to be displayed during the adding operation.

Referring back to operation 322, if the last motion was not in the downward direction, the direction of the user's last motion cannot be determined. As noted above, the user's last motion cannot always be determined. Accordingly, if user's last motion cannot be determined, the list above the added entry is moved in the upward direction and the list below the added entry is moved in the downward direction at operation 326.

Referring back to operation 316, if an add command is not input, it is determined if an exit list command is input at operation 328. If an exit list operation in not input at operation 328, the example method 300 returns to operation 302 to continue execution. If an exit list operation in input, the example method 300 ends by exiting the display of the list.

As described above, the example method 300 determines the user's most recent motion and controls the display of the list based on recent movement. By continuing to display the most recently displayed item, the example method 300 enhances the user experience.

In other examples, the method 300 may determine the last motion based on a history of movement after the input of the addition or deletion command For example, if the user frequently scrolls downward after the addition of a list item, then the example method 300 may determine that the last motion is downward direction, even if actual most recent movement is upward.

Figure 4B:
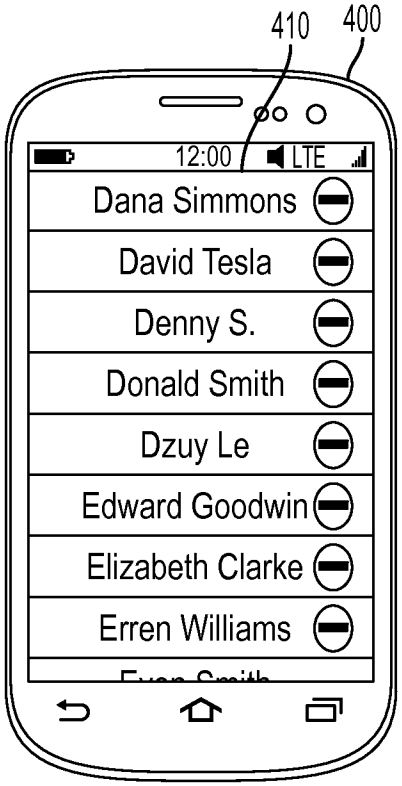
FIGS. 4A and 4B are diagrams illustrating a method of manipulating a list according to an embodiment of the present disclosure.
Figure 4A:
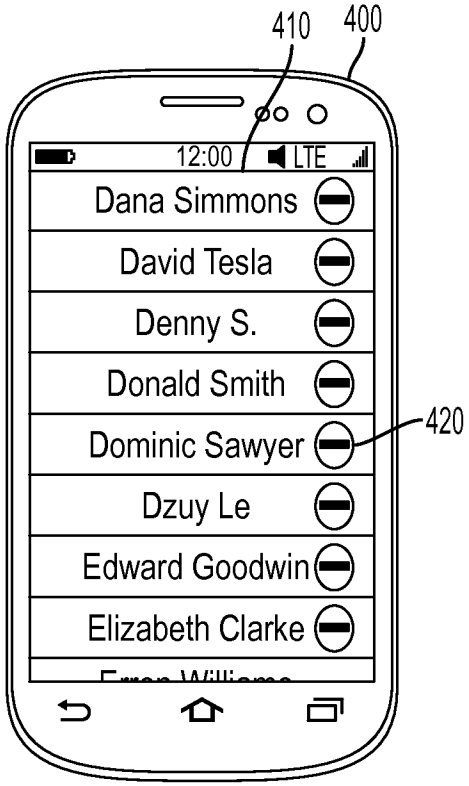

FIGS. 4A and 4B are diagrams illustrating a method of manipulating a list according to an embodiment of the present disclosure.

Referring to FIG. 4A, it is presumed that the terminal 400 initiates an application that displays a list 410 of contacts in alphabetical ordering beginning with given names of the letter "A" (e.g., Alexander Brown) and the user scroll has previously scrolled downward to display items in the list 410 such that contacts in the "D" and "E" are displayed. In this case, the contact "Elizabeth Clarke" is the most recently displayed and a contact below is partially displayed.

The user selects an input option 420 that corresponds to a delete command as illustrated in FIG. 4A to remove an entry as described above. Specifically, when the user inputs a command to remove "Dominic Sawyer," that particular entry in the list 410 is removed. Because the most recent movement in the list was downward, the entries below "Dominic Sawyer" are moved in the upward direction. Specifically, as illustrated in FIG. 4B, the partially displayed contact corresponding to "Erren Williams" is now fully displayed and a new partially displayed contact is provided.

Figure 5:
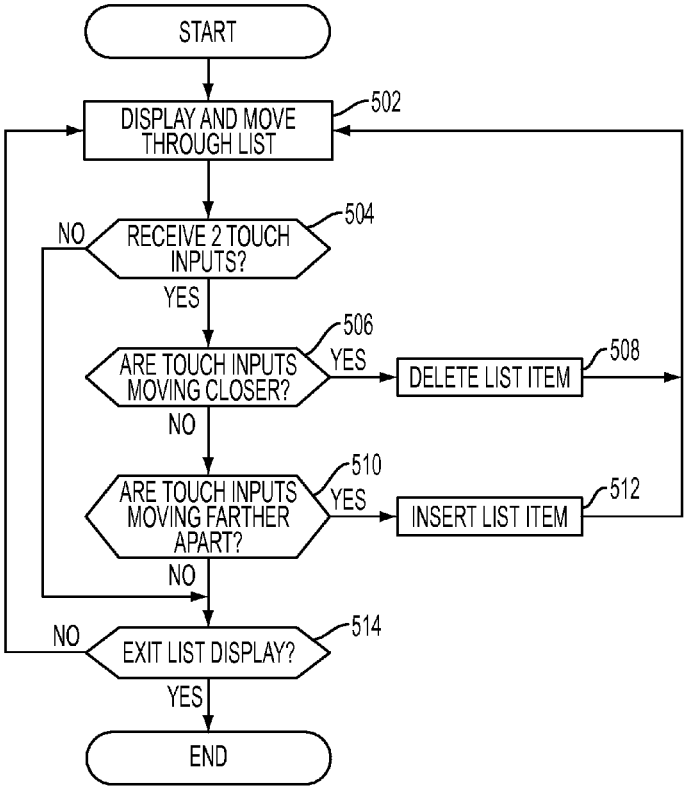
FIG. 5 is a flowchart illustrating a method of manipulating a list according to an embodiment of the present disclosure.

FIG. 5 is a flowchart illustrating a method of manipulating a list according to an embodiment of the present disclosure.

Referring to FIG. 5, another example method 500 is provided for displaying and manipulating a list. Although FIG. 5 is discussed within the context of a vertically displayed list, the example method 500 may also be implemented in a horizontally based list (e.g., a list of tabs, etc.). For purposes of clarity, it is presumed that FIG. 5 provides a list that displays names alphabetically in descending order (i.e., from A to Z), however the example of FIG. 5 can apply to any list that do not have any particular order (e.g., a list of notes, a grocery list, and so forth).

The method 500 is initiated at operation 502 when a user of the terminal device initiates a list by any suitable operation (e.g., viewing a list of contacts, creating multiple tabs in a web browser application, and so forth). The user at operation 502 moves through the list via any suitable input (e.g., scrolling through the list with a touch input, a stylus input at a fixed location to move the display down, etc.).

At operation 504, the method 500 determines if there are two simultaneous touch inputs. If there are two touch inputs at operation 504, it is determined if the touch inputs are moving closer together at operation 506. If the touch inputs are moving closer together, the method 500 determines a delete list item command is being input and deletes the corresponding list item at operation 508. As will be described in detail below, as the touch input moves closer together, the corresponding list entry is scaled (i.e., resized) according to the touch input to provide feedback to the user to display the list item to be deleted. After deletion of the list item at operation 508, the method 500 returns to operation 502.

Referring back to operation 506, if the two touch inputs are not moving closer together, it is determined if the touch inputs are moving farther apart at operation 510. If the touch inputs are moving farther apart, the method determines that an insert list item is being input and inserts a list item at operation 512. After operation 512, the method 500 returns to operation 502.

Referring back to operation 504, if it is determined that two touch inputs are not received, it is determined if an exit list command is input at operation 514. Further, referring back to operation 510, if the touch inputs are not moving farther apart at operation 510, it is determined if an exit list command is input at operation 514. If an exit list operation in not input at operation 514, the example method 500 returns to operation 502 to continue execution. If an exit list operation in input, the example method 500 ends by exiting the display of the list.

Figure 6A:
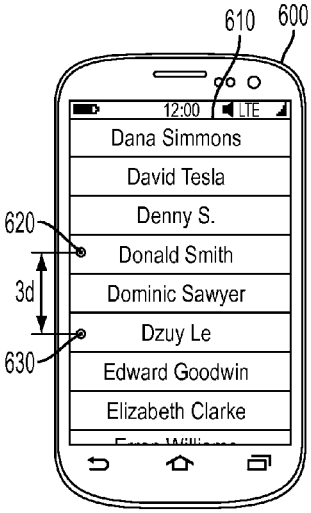
FIGS. 6A, 6B, and 6C are diagrams illustrating a method of manipulating a list according to an embodiment of the present disclosure.
Figure 6B:
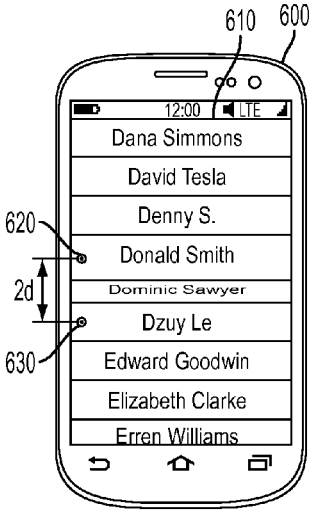
Figure 6C:
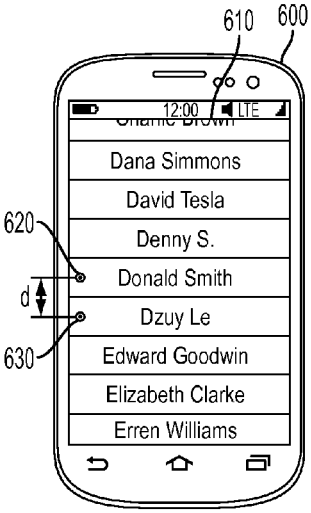

FIGS. 6A, 6B, and 6C are diagrams illustrating a method of manipulating a list according to an embodiment of the present disclosure.

Referring to FIG. 6A, it is presumed that a terminal 600 initiates an application that displays a list 610 of contacts in alphabetical ordering beginning with given names of the letter "A" (e.g., Alexander Brown) and the user scroll has previously scrolled downward to display items in the list 410 such that contacts in the "D" and "E" range are displayed. In this case, the contact "Elizabeth Clarke" is the most recently displayed and a contact below is partially displayed.

The user touches the terminal 600 as illustrated by points 620 and 630, which is separated by a distance 3d. As illustrated in FIG. 6A, the contact corresponding to "Dominic Sawyer" is disposed between the points 620 and 630 and may constitute the selected list entry. In other examples, multiple list entries may also be selected in this manner.

Referring to FIG. 6B, the user moves the touch inputs closer together such points 620 and 630 are separated by a distance of 2 d (i.e., the distance between 620 and 630 decreases 33%). Correspondingly, the terminal device 600 displays a list movement corresponding to the input, which moves content above the point 620 downward and content below the point 630 upward. As such, the display adjusts the display of the selected item by rescaling the selected list entry or list entries. Accordingly, this provides feedback to the user that the list entry corresponding to "Dominic Sawyer" will be deleted.

Referring to FIG. 6C, the user continues to move the touch inputs closer together such points 620 and 630 are separated by a distance of d (i.e., the distance between 620 and 630 decreases 66% with respect to the initial touch inputs). Accordingly, the terminal device 600 determines that a delete input is provided and deletes the entry corresponding to "Dominic Sawyer" as noted above.

Figure 7C:
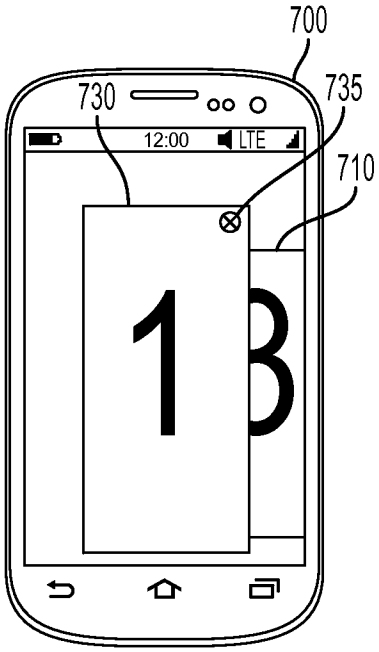
FIGS. 7A, 7B, and 7C are diagrams illustrating a method of manipulating a list according to an embodiment of the present disclosure.
Figure 7B:
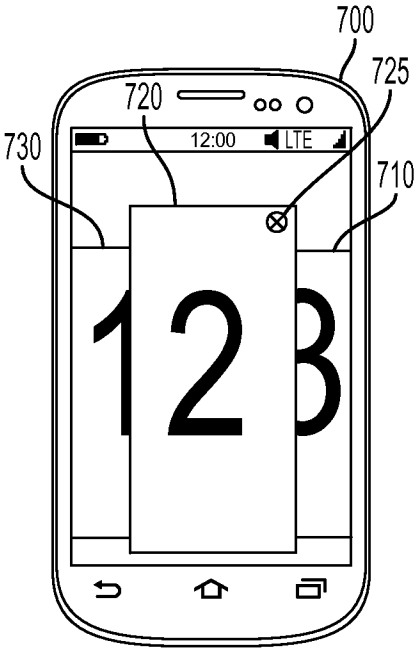
Figure 7A:
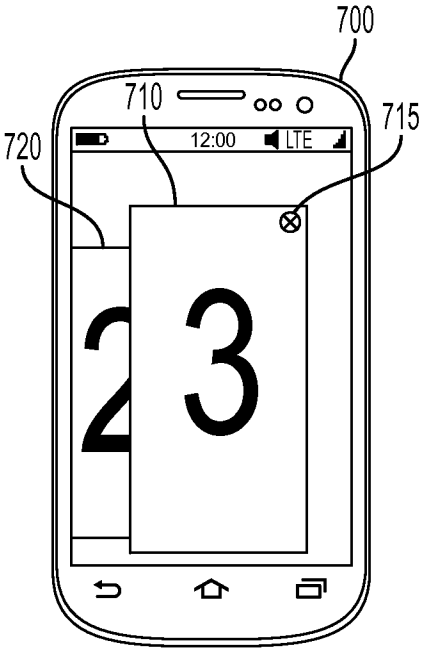

FIGS. 7A, 7B, and 7C are diagrams illustrating a method of manipulating a list according to an embodiment of the present disclosure.

Referring to FIGS. 7A, 7B, and 7C, another example of manipulating a list is disclosed in the form of tabs or windows that are arranged horizontally. In a terminal device, a web browser application may include a tabs or windows, which may be limited to a number of tabs due to memory limitations, for example.

As illustrated in FIG. 7A, to select a different tab or window, the browser is reduced in size and displayed such that the user can change the focus of the reduced tab and provide an input (e.g., a swipe) to the different tabs (e.g., delete, select, bookmark, and so forth). Specifically, in FIG. 7A, the application includes three tabs and the third tab 710 is displayed with the current focus. According to the related art, deletion of a tab results in the focus shifting to the most adjacent right tab. However, according to an embodiment of the present disclosure, the left adjacent tab may be selected according to previous input.

For example, as illustrated in FIG. 7A, three tabs are configured and the third tab 710 is the current focus. The third tab includes an icon 715 to remove the third tab 710 via a touch input. If the user is viewing the third tab, the user selects a command to move between the tabs. For example, if the user swipes from right to left, the swipe is determined to correspond to a leftword movement. As such, as illustrated in FIG. 7B, the focus is shifted leftward to the second tab 720, which includes an icon 725 to remove the second tab via a touch input. The first tab 730 and the third tab 710 may also be partially displayed in a reduced form in FIG. 7B. If the user selects the icon 725 to delete the second tab, the terminal device 700 deletes the second tab 720 from the group of tabs and determines that the recent movement is in the leftward direction. As such, and as illustrated in FIG. 7C, the terminal device continues the leftward movement and changes the focus to the first tab 730, which includes the icon 735 to delete the first tab from the group.

Accordingly, rather than return to the third tab after deleting the second tab, the terminal device continues the previous input motion during the manipulation of a list of items. As such, the inconvenience of always selecting the adjacent right tab can be mitigated.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

[1. A method for manipulating a list in a mobile terminal, the method comprising:

scrolling an item list in response to a first received command;

displaying a first set of items from the item list in the mobile terminal;

changing the item list based on a second received command to perform at least one of adding a new item to the item list or deleting an item from the item list;

determining, subsequent to the second received command, a previous scroll direction of the item list, the scroll direction in response to receipt of the first command;

determining items from the item list to display based on the determined previous scroll direction and the change of the item list; and displaying the determined items from the item list.]

[2. The method of claim 1, wherein the displaying of the determined items list from the item list comprises scrolling the item list according to the determined previous direction of the scrolling of the item list and according to the second received command to change the item list.]

[3. The method of claim 1, wherein the determining of the items from the item list to display comprises:

determining, if the second received command is to delete an item from the item list and if the determined previous direction is a downward direction, an item from the item list to display that is subsequent to the deleted item and is not displayed in the first set of items; and determining, if the second received command is to delete the item from the item list and if the determined previous direction is an upward direction, an item from the list of items to display that is prior to the deleted item and is not displayed in the first set of items.]

[4. The method of claim 3, wherein the determining of the items from the item list to display comprises:

determining, if the second received command is to add an item to the item list and if the determined previous direction is the downward direction, an item from the first set of items to remove from the display that is prior to the added item; and determining, if the second received command is to add the item to the item list and if the determined previous direction is the upward direction, an item from the first set of items to remove from the display that is subsequent to the added item.]

[5. The method of claim 3, further comprising:

determining, if the direction of the scrolling cannot be determined and if the second received command is to add the item to the item list, content from the first set of items to remove from the display that is prior to and subsequent to the added item; and determining, if the direction of the scrolling cannot be determined and if the second received command is to delete the item from the item list, content from the item list to display that is prior to and subsequent to the deleted item.]

[6. The method of claim 1, wherein the direction of the scrolling is input when a most recent input exceeds a threshold value that represents scrolling in the corresponding direction.]

[7. The method of claim 1, wherein the determining of the previous direction of the scrolling in the item list further comprises:

determining, based on historical data, a historical direction of scrolling after the changing of the item list; and setting, if the determined previous direction does not match the historical data of scrolling, the historical data of scrolling as the determined previous direction.]

[8. A method for manipulating a list in a mobile terminal, the method comprising:

displaying a first set of items from an item list in the mobile terminal;

changing the item list based on a received command;

determining a direction of a scrolling of the item list that occurred before receipt of the command;

determining items from the item list to display based on the determined direction and the change of the item list; and displaying the determined items from the item list;

wherein the determining of the items from the item list to display comprises:

determining, if the command is to delete an item from the item list and if the determined scrolling direction is a downward direction, an item from the item list to display that is subsequent to the deleted item and is not displayed in the first set of items; and determining, if the command is to delete the item from the item list and if the determined scrolling direction is an upward direction, an item from the list of items to display that is prior to the deleted item and is not displayed in the first set of items.]

[9. The method of claim 8, wherein the determining of the items from the item list to display comprises:

determining, if the command is to add an item to the item list and if the determined scrolling direction is the downward direction, an item from the first set of items to remove from the display that is prior to the added item; and determining, if the command is to add the item to the item list and if the determined scrolling direction is the upward direction, an item from the first set of items to remove from the display that is subsequent to the added item.]

[10. The method of claim 8, further comprising:

determining, if the direction of the scrolling cannot be determined and if the command is to add the item to the item list, content from the first set of items to remove from the display that is prior to and subsequent to the added item; and determining, if the direction of the scrolling cannot be determined and if the command is to delete the item from the item list, content from the item list to display that is prior to and subsequent to the deleted item.]

[11. An electronic device comprising:

a processor; and a memory including stored instructions executable by the processor and configured to cause to the processor to:

scroll an item list in response to a first received command, display a first set of items from the item list in the mobile terminal, change the item list based on a second received command to perform at least one of adding a new item to the item list or deleting an item from the item list, determine, subsequent to the second received command, a previous direction of the scrolling of the item list, the scrolling in response to receipt of the first command, determine items from the item list to display based on the determined previous direction and the change of the item list, and display the determined items from the item list.]

[12. The electronic device of claim 11, wherein the displaying of the determined items list from the item list comprises scrolling the item list according to the determined previous direction of the scrolling of the item list and according to the second received command to change the item list.]

[13. The electronic device of claim 11, wherein the determining of the items from the item list to display comprises:

determining, if the second received command is to delete an item from the item list and if the determined previous direction is a downward direction, an item from the item list to display that is subsequent to the deleted item and is not displayed in the first set of items; and determining, if the second received command is to delete the item from the item list and if the determined previous direction is an upward direction, an item from the list of items to display that is prior to the deleted item and is not displayed in the first set of items.]

[14. The electronic device of claim 13, wherein the determining of the items from the item list to display comprises:

determining, if the second received command is to add an item to the item list and if the determined previous direction is the downward direction, an item from the first set of items to remove from the display that is prior to the added item; and determining, if the second received command is to add the item to the item list and if the determined previous direction is the upward direction, an item from the first set of items to remove from the display that is subsequent to the added item.]

[15. The electronic device of claim 13, wherein the stored instructions executable by the processor are further configured to cause to the processor to:

determine, if the direction of the scrolling cannot be determined and if the second received command is to add the item to the item list, content from the first set of items to remove from the display that is prior to and subsequent to the added item; and determine, if the direction of the scrolling cannot be determined and if the second received command is to delete the item from the item list, content from the item list to display that is prior to and subsequent to the deleted item.]

[16. A non-transitory computer processor readable storage medium including instructions, executable by a processor, stored thereon to perform a method comprising:

scrolling an item list in response to a first received command;

displaying a first set of items from the item list in the mobile terminal;

changing the item list based on a second received command to perform at least one of adding a new item to the item list or deleting an item from the item list;

determining, subsequent to the second received command, a previous direction of the scrolling of the item list, the scrolling in response to receipt of the first command;

determining items from the item list to display based on the determined previous direction and the change of the item list; and displaying the determined items from the item list.]

[17. The non-transitory computer processor readable storage medium of claim 16, wherein the displaying of the determined items list from the item list comprises scrolling the item list according to the determined previous direction of the scrolling of the item list and according to the second received command to change the item list.]

[18. The non-transitory computer processor readable storage medium of claim 16, wherein the determining of the items from the item list to display comprises:

determining, if the second received command is to delete an item from the item list and if the determined previous direction is a downward direction, an item from the item list to display that is subsequent to the deleted item and is not displayed in the first set of items; and determining, if the second received command is to delete the item from the item list and if the determined previous direction is an upward direction, an item from the list of items to display that is prior to the deleted item and is not displayed in the first set of items.]

[19. The non-transitory computer processor readable storage medium of claim 18, wherein the determining of the items from the item list to display comprises:

determining, if the second received command is to add an item to the item list and if the determined previous direction is the downward direction, an item from the first set of items to remove from the display that is prior to the added item; and determining, if the second received command is to add the item to the item list and if the determined previous direction is the upward direction, an item from the first set of items to remove from the display that is subsequent to the added item.]

[20. The non-transitory computer processor readable storage medium of claim 18, wherein the instructions executable by the processor are further configured to cause to the processor to:

determine, if the direction of the movement-scrolling cannot be determined and if the second received command is to add the item to the item list, content from the first set of items to remove from the display that is prior to and subsequent to the added item; and determine, if the direction of the scrolling cannot be determined and if the second received command is to delete the item from the item list, content from the item list to display that is prior to and subsequent to the deleted item.]

*21. A method performed by a mobile terminal, the method comprising:*

*displaying, on a display of the mobile terminal, a first content item from a set of content items;*

*based on the set of content items corresponding to a first set of content items that includes the first content item, a second content item following the first content item, and a third content item following the second content item:*

*receiving a first touch input for scrolling the first set of content items in a first scrolling direction to display the second content item from the first set of content items,*

*based on the first touch input, displaying, on the display of the mobile terminal, the second content item from the first set of content items,*

*receiving a second touch input for deleting the displayed second content item from the first set of content items, and*

*based on the second touch input, displaying, on the display of the mobile terminal, the third content item from the first set of content items as a result of the first scrolling direction; and*

*based on the set of content items corresponding to a second set of content items including the first content item, a fourth content item preceding the first content item, and a fifth content item preceding the fourth content item:*

*receiving a third touch input for scrolling the second set of content items in a second scrolling direction to display the fourth content item from the second set of content items, the second scrolling direction being opposite to the first scrolling direction,*

*based on the third touch input, displaying, on the display of the mobile terminal, the fourth content item from the second set of content items,*

*receiving a fourth touch input for deleting the displayed fourth content item from the second set of content items, and*

*based on the fourth touch input, displaying, on the display of the mobile terminal, the fifth content item from the second set of content items as a result of the second scrolling direction.*

*22. The method of claim 21, further comprising:*

*controlling the display to display a deletion icon in conjunction with each content item, wherein the second touch input for deleting the displayed second content item comprises a selection of the deletion icon associated with the displayed second content item.*

*23. The method of claim 21, wherein:*

*the first scrolling direction is one of: upward or downward; and*

*the second scrolling direction is a different one of: upward or downward.*

*24. The method of claim 21, wherein:*

*the first scrolling direction is one of: right or left; and*

*the second scrolling direction is a different one of: right or left.*

*25. The method of claim 21, wherein, prior to receiving the second touch input:*

*each of the first, second, and third content items is at least partially visible on the display; and*

*the second content item has focus on the display.*

*26. The method of claim 25, wherein, after receiving the second touch input and controlling the display to display the third content item, the third content item has focus on the display.*

*27. The method of claim 21, wherein, prior to receiving the second touch input, the second content item has focus on the display.*

*28. An electronic device comprising:*

*a display;*

*a processor; and*

*a memory including stored instructions executable by the processor and configured to cause the processor to:*

*display, on the display of the electronic device, a first content item from a set of content items,*

*based on the set of content items corresponding to a first set of content items that includes the first content item, a second content item following the first content item, and a third content item following the second content item:*

*receive a first touch input for scrolling the first set of content items in a first scrolling direction to display the second content item from the first set of content items,*

*based on the first touch input, display, on the display of the electronic device, the second content item from the first set of content items,*

*receive a second touch input for deleting the displayed second content item from the first set of content item, and*

*based on the second touch input, display, on the display of the electronic device, a third content item from the first set of content items as a result of the first scrolling direction,*

*based on the set of content items corresponding to a second set of content items including the first content item, a fourth content item preceding the first content item, and a fifth content item preceding the fourth content item:*

*receive a third touch input for scrolling the second set of content items in a second scrolling direction to display the fourth content item from the second set of content items, the second scrolling direction being opposite to the first scrolling direction,*

*based on the third touch input, display, on the display of the electronic device, the fourth content item from the second set of content items,*

*receive a fourth touch input for deleting the displayed fourth content item from the second set of content items, and*

*based on the fourth touch input, display, on the display of the electronic device, the fifth content item from the second set of content items as a result of the second scrolling direction.*

*29. The electronic device of claim 28, wherein the instructions when executed further cause the processor to control the display to display a deletion icon in conjunction with each content item, wherein the second touch input for deleting the displayed second content item comprises a selection of the deletion icon associated with the displayed second content item.*

*30. The electronic device of claim 28, wherein:*

*the first scrolling direction is one of: upward or downward; and*

*the second scrolling direction is a different one of: upward or downward.*

*31. The electronic device of claim 28, wherein:*

*the first scrolling direction is one of: right or left; and*

*the second scrolling direction is a different one of: right or left.*

*32. The electronic device of claim 28, wherein the instructions when executed cause the processor to operate such that, prior to receiving the second touch input:*

*each of the first, second, and third content items is at least partially visible on the display; and*

*the second content item has focus on the display.*

*33. The electronic device of claim 32, wherein the instructions when executed cause the processor to operate such that, after the second touch input is received and the display is controlled to display the third content item, the third content item has focus on the display.*

*34. The electronic device of claim 28, wherein the instructions when executed cause the processor to operate such that, prior to receiving the second touch input, the second content item has focus on the display.*

*35. A non-transitory computer processor readable storage medium including instructions that when executed cause a processor of an electronic device to:*

*display, on a display of the electronic device, a first content item from a set of content items,*

*based on the set of content items corresponding to a first set of content items that includes the first content item, a second content item following the first content item, and a third content item following the second content item:*

*receive a first touch input for scrolling the first set of content items in a first scrolling direction to display the second content item from the first set of content items,*

*based on the first touch input, display, on the display of the electronic device, the second content item from the first set of content items,*

*receive a second touch input for deleting the displayed second content item from the first set of content item, and*

*based on the second touch input, display, on the display of the electronic device, a third content item from the first set of content items as a result of the first scrolling direction,*

*based on the set of content items corresponding to a second set of content items including the first content item, a fourth content item preceding the first content item, and a fifth content item preceding the fourth content item:*

*receive a third touch input for scrolling the second set of content items in a second scrolling direction to display the fourth content item from the second set of content items, the second scrolling direction being opposite to the first scrolling direction,*

*based on the third touch input, display, on the display of the electronic device, the fourth content item from the second set of content items,*

*receive a fourth touch input for deleting the displayed fourth content item from the second set of content items, and*

*based on the fourth touch input, display, on the display of the electronic device, the fifth content item from the second set of content items as a result of the second scrolling direction.*

*36. The non-transitory computer processor readable storage medium of claim 35, wherein the instructions when executed further cause the processor to control the display to display a deletion icon in conjunction with each content item, wherein the second touch input for deleting the displayed second content item comprises a selection of the deletion icon associated with the displayed second content item.*

*37. The non-transitory computer processor readable storage medium of claim 35, wherein:*

*the first scrolling direction is one of: upward or downward; and*

*the second scrolling direction is a different one of: upward or downward.*

*38. The non-transitory computer processor readable storage medium of claim 35, wherein:*

*the first scrolling direction is one of: right or left; and*

*the second scrolling direction is a different one of: right or left.*

*39. The non-transitory computer processor readable storage medium of claim 35, wherein the instructions when executed cause the processor to operate such that, prior to receiving the second touch input:*

*each of the first, second, and third content items is at least partially visible on the display of the electronic device; and*

*the second content item has focus on the display of the electronic device.*

*40. The non-transitory computer processor readable storage medium of claim 39, wherein the instructions when executed cause the processor to operate such that, after the second touch input is received and the display is controlled to display the third content item, the third content item has focus on the display.*

*41. The non-transitory computer processor readable storage medium of claim 35, wherein the instructions when executed cause the processor to operate such that, prior to receiving the second touch input, the second content item has focus on the display of the electronic device.*

*42. A method performed by a mobile terminal, the method comprising:*

*displaying, on a display of the mobile terminal, a first content item from a set of content items;*

*while the first content item is displayed, receiving a touch input;*

*based on the touch input being a first touch input corresponding to scrolling the set of content items in a first scrolling direction:*

*displaying, on the display, a second content item of the set of content items, the second content item following the first content item and preceding a third content item in the set of content items,*

*while the second content item is displayed on the display, receiving a second touch input, wherein the second touch input is for deleting the displayed second content item from the set of the content items, and*

*based on the second touch input, deleting the second content item from the set of the content items and displaying, on the display, the third content item of the set of the content items; and*

*based on the touch input being a third touch input corresponding to scrolling the set of content items in a second scrolling direction, the second scrolling direction being opposite to the first scrolling direction:*

*displaying, on the display, a fourth content item of the set of content items, the fourth content item preceding the first content item and following a fifth content item in the set of content items,*

*while the fourth content item is displayed, receiving a fourth touch input, wherein the fourth touch input is for deleting the fourth content item from the set of the content items, and*

*based on the fourth touch input, deleting the fourth content item and displaying, on the display, the fifth content item of the set of content items.*

*43. An electronic device comprising:*

*a display;*

*a processor; and*

*a memory including stored instructions executable by the processor and configured to cause the processor to:*

*display, on the display, a first content item from a set of content items,*

*while the first content item is displayed, receive a touch input,*

*based on the touch input being a first touch input corresponding to scrolling the set of content items in a first scrolling direction:*

*display, on the display, a second content item of the set of content items, the second content item following the first content item and preceding a third content item in the set of content items,*

*while the second content item is displayed on the display, receive a second touch input, wherein the second touch input is for deleting the displayed second content item from the set of the content items, and*

*based on the second touch input, delete the second content item from the set of the content items and display, on the display, the third content item of the set of the content items; and*

*based on the touch input being a third touch input corresponding to scrolling the set of content items in a second scrolling direction, the second scrolling direction being opposite to the first scrolling direction:*

*display, in the display, a fourth content item of the set of content items, the fourth content item preceding the first content item and following a fifth content item in the set of content items,*

*while the fourth content item is displayed, receive a fourth touch input, wherein the fourth touch input is for deleting the fourth content item from the set of the content items, and*

*based on the fourth touch input, delete the fourth content item and display, on the display, the fifth content item of the set of content items.*

* * * * *